United States Patent [11] 3,591,280

[72] Inventor Geoffrey M. Rhodes, Minneapolis, Minn.
[21] Appl. No. 790,215
[22] Filed Jan. 10, 1969
[45] Patented July 6, 1971
[73] Assignee Pako Corporation, Minneapolis, Minn.

[54] LIGHT SENSOR
14 Claims, 5 Drawing Figs

[52] U.S. Cl. ............................................. 355/38, 356/236
[51] Int. Cl. ....................................................... G03b 27/74
[50] Field of Search ........................................ 355/32, 38; 356/173, 176, 177, 222, 236

[56] References Cited
UNITED STATES PATENTS
2,483,452  10/1949  Berkley .......................... 356/176
3,229,569  1/1966   Frost et al. ....................... 355/38

Primary Examiner—Samuel S. Matthews
Assistant Examiner—Richard A. Wintercorn
Attorney—Wisko & Nemer ABSTRACT: A light-sensing device having a light-integrating chamber, the chamber having a light entrance aperture and light outlet apertures. Photosensitive cells facing the outlet apertures read the integrated light reflected from the interior wall of the chamber.

INVENTOR
GEOFFREY M. RHODES
BY
Carlsen, Carlsen, Sturm & Wicks
ATTORNEYS

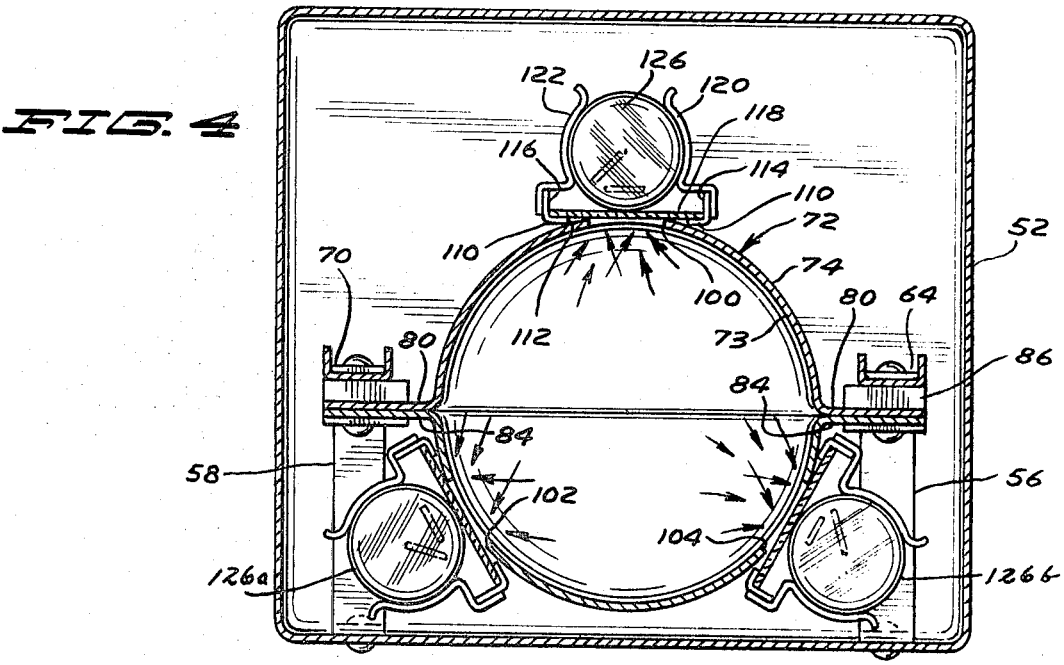
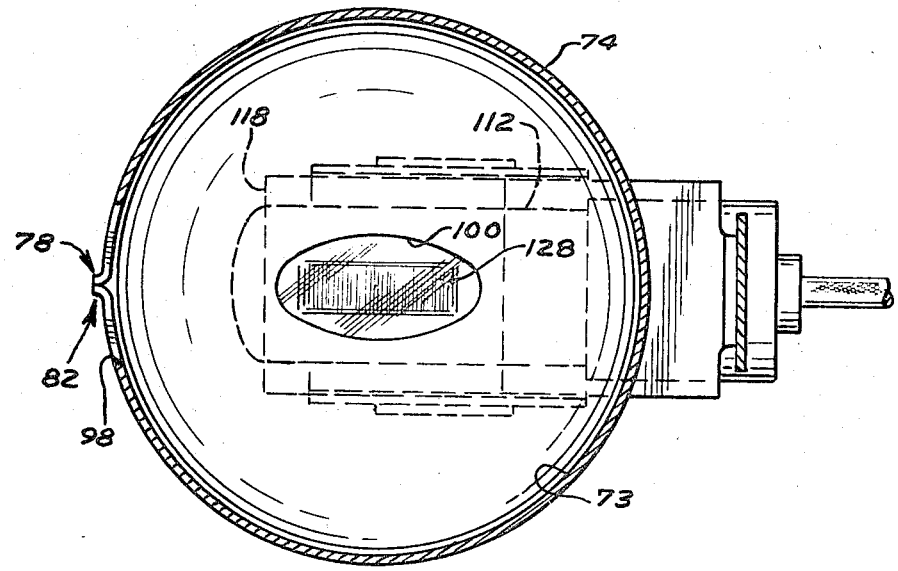

LIGHT SENSOR

SUMMARY OF THE INVENTION

The invention relates to an improvement in photographic printers and more particularly to means for directing the printing light of the image of a negative to means sensitive to image color and density for sampling of the printing light. One type of light sampling means includes a photosensitive cell having a cathode upon which the light of the negative impinges. The printing light is directed to the cathode of the photocell by optical means including beam splitters and similar means. This is costly and difficult alignment, and with optical direction of the printing light to the cathode of a photocell the light is necessarily directed to only a portion of the cathode which is normally not uniformly sensitive over its entire surface. The present invention eliminates the variable of the pattern of the image on the cathode surface.

It is an object of this invention to provide a chamber for integrating the printing light image and directing the integrated image on the entire photosensing surface during the reading time whereby a positive and complete reading may be had. The photocell output is connected to timer circuits which measure the color sampled by a filter between a chamber exit aperture and the photocell, and each timer circuit produces an electrical output signal when a predetermined quantity of light of the particular color has been collected by the photocell. The electrical output signals are then utilized to control the color of the light stream by placing light modifying or printing filters in the light stream.

The invention can be used to respond to a white light source and "subtractive" filters to complete any color exposure required and can also be used with a trilight "additive" system using primary color filters with which the sensors control shutters to terminate any given color. In a subtractive system the sensors provide a control to satisfy any remaining exposure needed relative to any sensitive layer. Each sensor is channeled to a conventional timing or control circuit of a type found in U.S. Pat. No. 3,293,033 and U.S. Pat. No. 3,241,441 as typical but not confining. The invention is also usable with a black and white printing system using in connection with the chamber one photocell as a sensor or sampling means opposite a light outlet aperture.

These and other more detailed and specific objects will be disclosed in the course of the following specification, reference being had to the accompanying drawings, in which:

FIG. 4 is a sectional view on the line 4-4 of FIG. 3.

FIG. 5 is a sectional view on the line 5-5 of FIG. 3.

Figure 1:
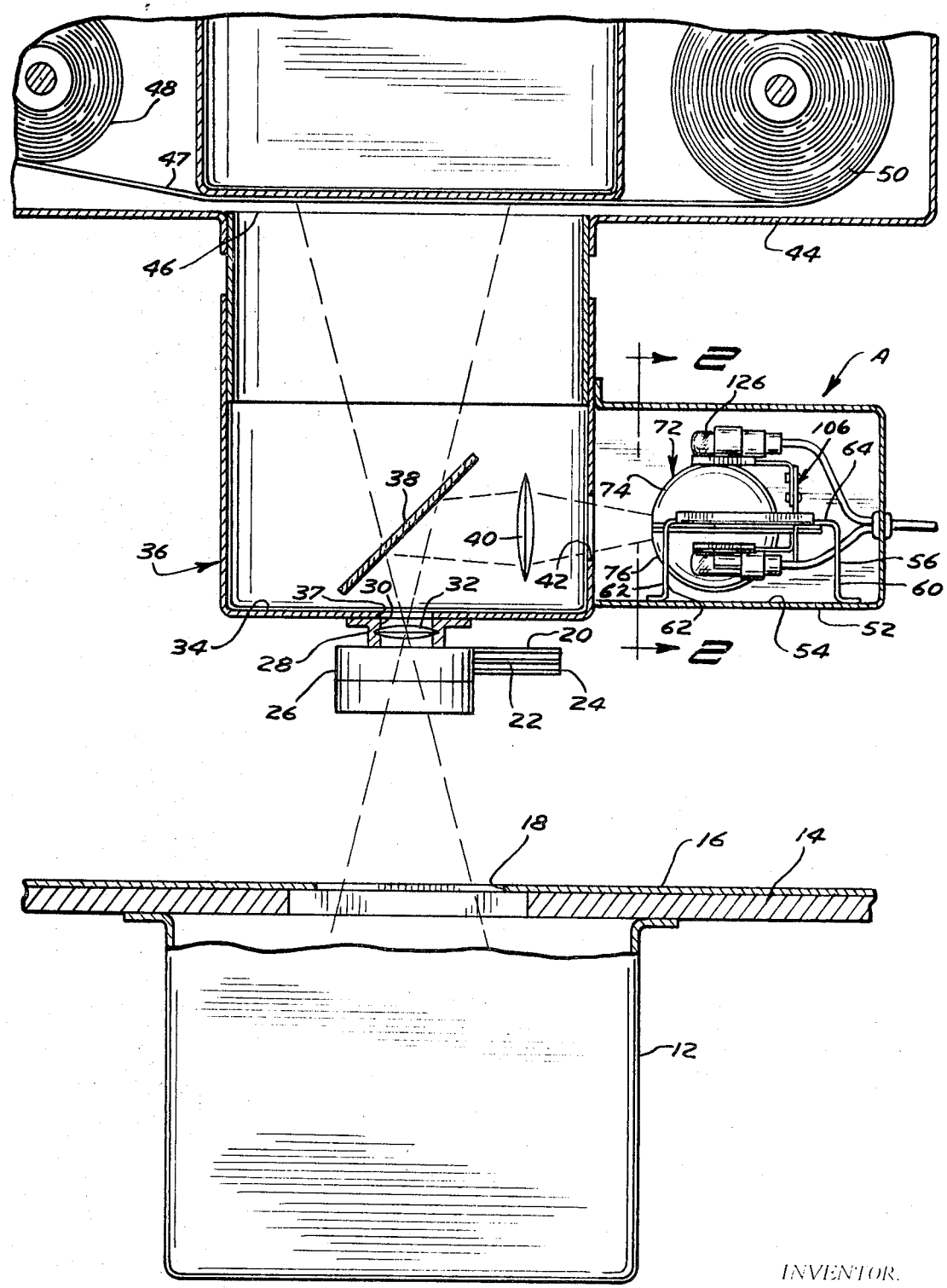
FIG. 1 is a longitudinal sectional view of a portion of a photographic printer embodying the invention.
Figure 2:
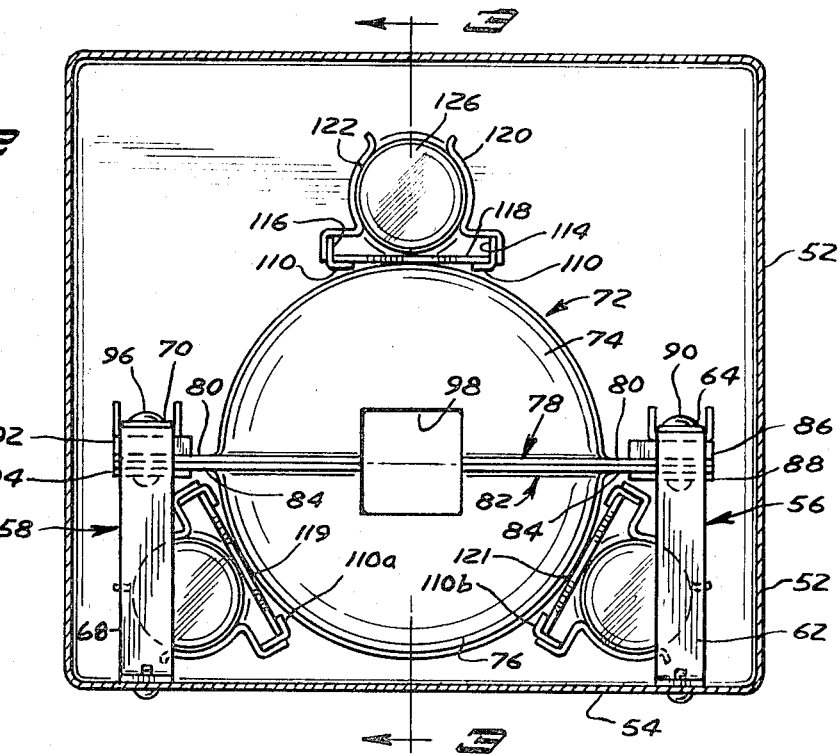
FIG. 2 is a sectional view on the line 2-2 of FIG. 1.
Figure 3:
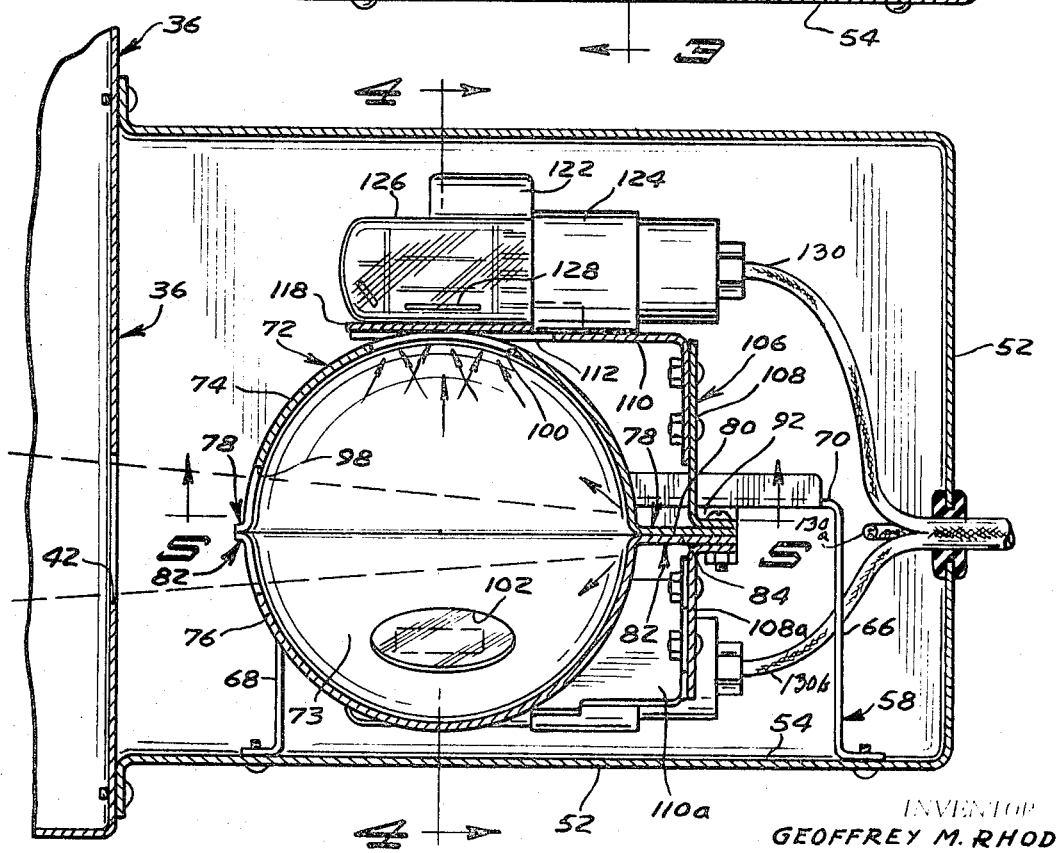
FIG. 3 is a sectional view on the line 3-3 of FIG. 2.

Referring to the drawings in detail, the environment for the light sensor A will be briefly described. FIG. 1 discloses a conventional enlarging printer including a housing 12 in which is housed a printing light. The housing 12 is mounted on the tabletop 14 having the mask 16 formed with the opening 18 upon which the negative is placed. The mask 16 is the negative plane. The opening 18 is in alignment with a plurality of complementary light-modifying filters 20, 22 and 24 mounted in the mount 26. Conventional means for moving the filters 20, 22 and 24 into filtering position is shown in the aforementioned patents.

The mount 26 is connected to the annular flange 28 which defines the opening 30 and mounted in the opening 30 is the projection lens 32. The flange 28 is mounted on the lower end 34 of the housing 36 in alignment with the opening 37 in the end 34. Mounted within the housing 36 is the beam splitter 38 and the relay lens 40. The wall of the housing 36 is formed with the opening 42, and the housing 36 is connected at the upper end thereof to the cabinet 44 at the opening 46 thereof at which the sensitized printing paper 47 is positioned from the supply spool 48. The paper is taken up on the takeup spool 50.

The numeral 52 designates a housing secured to the housing 36 in alignment with the opening 42. Secured to the bottom 54 of the housing 52 are the two spaced brackets 56 and 58. The bracket 56 includes the legs 60 and 62 connected to the cross member 64, and the bracket 58 includes the legs 66 and 68 connected to the crossmember 70. The numeral 72 designates a chamber in the form of a sphere. The sphere 72 is formed of the first half 74 and the complementary second half 76. The sphere half 74 is formed with the flange 78 enlarged at the outer and side portions as at 80, and the sphere half 76 is formed with the flange 82 enlarged at the outer and side portions 84. The flange portions of the sphere halves are joined by screws, cement or any other well-known fastening means to form the sphere 72. The inner surface 73 of the sphere is coated with a diffused light reflecting material.

Further provided is a first mounting block 86 which is placed upon the flange side portions 80 of sphere half 74 and beneath the cross member 70 with the sphere half 76 upon the sphere half 74 and the flanges in mating relation. Positioned beneath the flange portion 84 is the plate 88 and extended through the plate 88, the flange portions 84 and 80, the block 86 and the support member 64 are a plurality of nut equipped bolts 90 thereby securing the flanges together to form the sphere and support the same.

The sphere 72 is further held together and supported by the flange portions 80 and 84 positioned beneath a second mounting block 92 positioned beneath the support member 70 with the plate 94 below the flange portions. Extending through the support 70, the block 92, the flange portions 80 and 84 and the plate 94 are a plurality of nut equipped bolts 96 thereby further securing the flange portions together and supporting the sphere 72.

The sphere 72 has formed in the wall thereof the light entrance aperture 98 which is shown as rectangle in outline but which may be circular in outline or have other configurations. Also formed in the wall of the sphere are the light exit apertures 100, 102 and 104 formed equidistant and on a plane of an equator normal to the plane on which the entrance aperture 98 if formed. The exit apertures are shown as elliptical in outline but may be of other configurations.

The numeral 106 designates a first right angle bracket having the legs 108 and 110 with the leg 108 secured at the outer end to the flanges 80 and 84 of the sphere 72. The bracket leg 110 has an opening 112 formed therein and on the outer edges of the leg 110 are formed the flanges 114 and 116. Positioned on the bracket leg 110 between the flanges 114 and 116 over the opening 112 is the filter 118. Secured to the flange 114 is a first spring clip 120 and secured to the flange 116 is a second spring clip 122 complementary to the clip 120. The longitudinal center line of the bracket 110 and the opening 112 thereof is in alignment with the centerline of the light exit aperture 100.

The spring clips 120 and 122 are adapted to removably mount there between the base 124 of the sensor member 126, one form being the photodiode tube 126 containing the cathode 128 which is held adjacent to and in alignment with the exist aperture 100. Positioned opposite the light exit apertures 102 and 104 are identical brackets having identical parts each mounting a photodiode tube 126, the identical parts bearing the same reference numerals but accompanied with a lower case letter *a* with reference to aperture 102 and a lower case letter *b* relative to aperture 104. Filter 118 is red, and further provided is filter 119 which is blue and filter 121 which is green. The bracket 110a mounts the photodiode tube 126a in line with the light exit aperture 102, and the bracket 110b mounts the photodiode tube 126b in line with the light exit aperture 104. Each of the photodiode tubes 126, 126a and 126b has leading there from the lines 130, 130a and 130b, respectively, for conducting the output of each photodiode, said lines connected to conventional timing circuits found in printers of a type found in the aforementioned U.S. Patents. The invention herein may be also applied to a black and white printer which would utilize one photodiode opposite a single light exit aperture such as 100 in a sphere.

It will be seen that printing light coming through a colored negative positioned upon opening 18 is directed in part to the entrance aperture 98 of the sphere by means of the beam splitter and the relay lens 40. The printing light containing the whole image of the negative enters the sphere 72 and strikes the inner surface where it is reflected back and forth thereby becoming integrated. The integrated light then impinges upon the entire exposed cathode of each of the photodiodes at the exit apertures 100, 102 and 104 during the reading time. With the printing light integrated in the sphere all of the densities of the negative are integrated regardless of the position or pattern of the negative. As a result a true color density is read from any kind of a whole negative and simultaneously a continuous signal is sent to its own control circuit during the whole exposure of the negative. It will be seen that the device A herein described can be used to respond to a white light source and "subtractive" printing filters to complete any color exposure needed and can also be used with a trilight "additive" system where the sensors would control the shutter to terminate any given color. In the "subtractive" system the sensors would control to satisfy any remaining exposure needed relative to any sensitive layer, each sensor channeled to a conventional timing or control circuit.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a photographic color printer having means for directing white light through a color negative and directing the same to sensitized material for printing, the combination of
   a. means for producing a sample of light passing through the negative,
   b. a light-integrating chamber having
   c. a light entrance aperture through which the light sample is directed into the chamber,
   d. said chamber having a number of outlet apertures spaced about the axes of the light sample entering the chamber,
   e. photosensitive cells having cathodes facing said outlet apertures,
   f. color filters covering said outlet apertures,
   g. suitable color filters insertable in the path of the light emanating from the negative, and
   h. means operated by said cells for moving the second named filters into filtering position.

2. The device of claim 1 in which said chamber is spherical.
3. The device of claim 2 in which said outlet apertures are circumferentially equally spaced about the axes of the light sample entering the chamber.
4. The device of claim 3 in which the outlet aperture is of a configuration to expose the entire cathode of the cells.
5. The device of claim 4 in which the outlet apertures are positioned about a great circle of the sphere whose plane is parallel to the plane of the inlet aperture.
6. The device of claim 5 in which said integrating sphere has an inner light diffused reflecting surface.
7. The device of claim 6 in which the photosensitve cell is a photodiode.
8. The device of claim 1 in which said outlet apertures are circumferentially equally spaced about the axis of the light sample entering the chamber.
9. The device of claim 1 in which the outlet aperture is of a configuration to expose the entire cathode of the cell.
10. In a photographic color printer having means for directing white light through a color negative and directing the same to sensitized material for printing, the combination of
    a. means for producing a sample of light passing through the negative,
    b. a light-integrating chamber having
    c. a light entrance aperture through which the light sample is directed into the chamber,
    d. said chamber having a number of outlet apertures spaced about the axes of the light sample entering the chamber,
    e. photoelectric means sensitive to different colors disposed opposite said outlet apertures,
    f. suitable color filters insertable in the path of the light emanating from the negative, and
    g. means operated by said photoelectric means for moving said filters into filtering position.

11. In a photographic printer having means for directing white light through a negative and directing the same to sensitized material for printing, the combination of
    a. means for producing a sample of the light passing through the negative,
    b. a light-integrating chamber having
    c. a light entrance aperture through which the light sample is directed into the chamber,
    d. said chamber having an outlet aperture spaced from the axes of the light sample entering the chamber, and
    e. a photosensitive cell disposed opposite said outlet aperture for reading the light reflected from the interior of said chamber onto the cell.

12. The device of claim 11 in which said chamber is spherical.
13. The device of claim 12 in which said outlet aperture is positioned on a great circle of the spherical chamber whose plane is parallel to the plane of the inlet aperture.
14. A light analyzer for a photographic printer comprising:
    a. a chamber,
    b. said chamber having a light entrance aperture through which light is directed into the chamber and
    c. light outlet means spaced from the axes of the light entering the chamber, and
    d. light sensing means facing each of said light outlet means for reading the light reflected from the interior of said chamber onto the sensing means.